March 3, 1931.  H. E. WARREN  1,795,189
ELECTRICALLY WOUND CLOCK
Filed Dec. 21, 1926
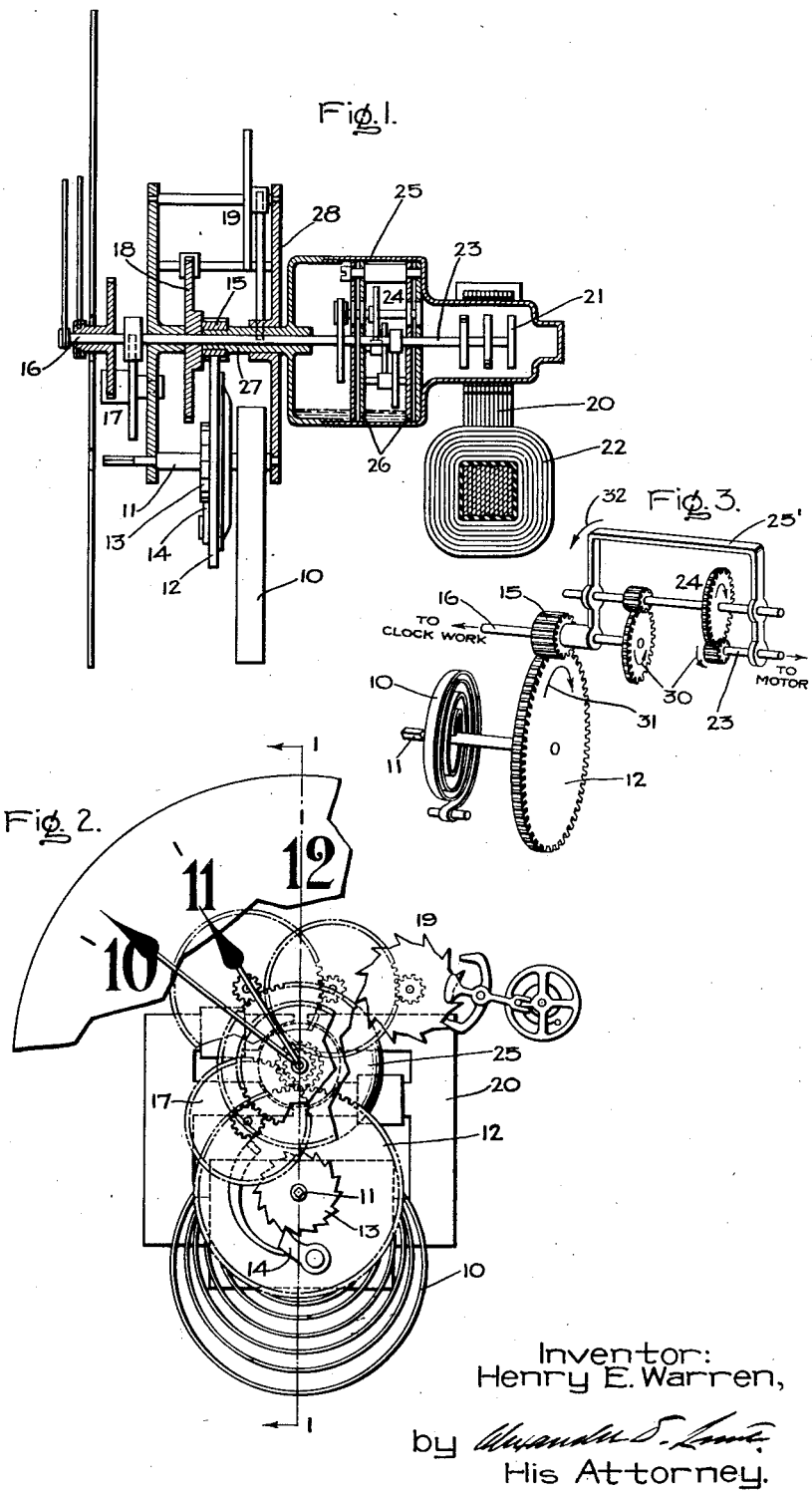
Inventor:
Henry E. Warren,
by
His Attorney.

Patented Mar. 3, 1931

1,795,189

UNITED STATES PATENT OFFICE

HENRY E. WARREN, OF ASHLAND, MASSACHUSETTS, ASSIGNOR TO WARREN TELE-CHRON COMPANY, OF ASHLAND, MASSACHUSETTS, A CORPORATION OF MAINE

ELECTRICALLY-WOUND CLOCK

Application filed December 21, 1926. Serial No. 156,206.

My invention relates to clock movements and in particular to an ordinary spring driven clock movement combined with an electric motor in a novel way such that the electric motor ordinarily furnishes the power for driving the clock, winds up the clock spring when it is unwound, and permits the spring to unwind and drive the clock whenever the electric motor stops. By a clock movement I mean any movement which is required to be driven at a substantially constant speed and a substantially constant torque, which movement is restrained to run at such speed.

The features of my invention which are believed to be novel and patentable will be pointed out in the claims appended hereto. For a better understanding of the invention, reference is made in the following description to the accompanying drawing, Fig. 2 of which shows a face view of the essential parts of an ordinary spring driven clock movement modified in accordance with my invention. Fig. 1 is a sectional view of the movement taken on line 1—1 of Fig. 2 and Fig. 3 is a diagrammatic explanatory figure to more clearly show the principle of operation.

Referring to the drawing, 10 represents the usual clock spring. This spring has its outer end secured to a stationary part of the clock framework. Only a portion of the framework is shown in the drawing for the sake of clearness. The inner end of the spring is secured to the usual winding shaft 11 and when the spring is wound it produces a torque on shaft 11 tending to turn it in a counter-clockwise direction as viewed in Fig. 2. This torque is conveyed to the gear wheel 12 through the ratchet wheel 13 and and pawl 14, ratchet-wheel 13 being secured to shaft 11 and pawl 14 being secured to gear wheel 12. This comprises a usual winding and driving arrangement found on inexpensive clock movements. Gear 12 meshes with a gear 15. In an ordinary clock movement the gear 15 would be secured directly to the shaft 16 which drives the clock train indicated at 17 and to a gear wheel 18 leading to the escapement mechanism indicated at 19 and more fully shown in Fig. 2. However, in accordance with my invention the rotating element of an electric motor is differentially connected with the gear wheel 15 to drive shaft 16 in the manner now to be described.

The electric motor and the gear reduction employed therewith in the modification here represented is of the general type described in my United States Patent 1,495,936. The motor here represented is of the self-starting synchronous type. However, so far as its use here is concerned, the motor does not have to be a synchronous motor, or in fact an electric motor, and if it is a synchronous electric motor it will ordinarily run below synchronism. The motor comprises a stationary shaded pole stator member 20 and a rotor member 21. When alternating current is applied to the winding 22 of the stator element a shifting magnetic field is produced through the rotor causing its rotation. The rotor is connected by means of shaft 23 through a gear train represented at 24 to the shaft 16 of the clock. The gear train 24 very materially reduced the speed ratio between shafts 23 and 16 which permits a very small high speed motor to be employed and at the same time gives ample torque for operating the clock and winding up the spring. It will be noted that the rotor 21 and the gear train 24 are contained in a casing 25 substantially as described in the patent above referred to. The casing is preferably sealed and contains oil for lubricating the various rotating parts contained therein. The gears and connecting shafts are supported in partitions 26 which are arranged in pairs close together to form capillary spaces through which the oil will rise to the various bearings.

From the above description it is evident that when the motor is in operation it will drive the clock shaft 16 at a speed determined by the escapement mechanism 19. In order that this motor may wind the clock spring 10 and permit said spring to drive the clock when, for any reason, the motor stops, I have mounted the entire casing 25 so that it will rotate. The casing is provided with a hollow shaft 27 on the same axis of rotation with the terminal shafts 23 and 16. This hollow shaft extends through and has a bearing in the clock plate 28. The shaft 16 extends through the hollow shaft 27 for a considerable distance and assists in properly supporting the casing 25 in its rotative position. The gear 15, which is in driving relation with the clock spring 10 through gear 12, is secured to the hollow shaft 27 and consequently is fixed to the casing 25. The extension of the gear casing which encloses the rotor passes through the stator 20 of the motor with a slight clearance so that the casing 25 is free to rotate. It is not essential that the rotor be thus enclosed but I have found it to be a desirable arrangement for keeping out dirt and protecting the rotating element. The casing, or at least that part which encloses the rotor, is of non-magnetic material such as brass.

A simplified explanatory diagram of this arrangement is shown in Fig. 3 where rotatably mounted frame 25' takes the place of the gear casing of Fig. 1. When the clock spring 10 is wound it is evident that the electric motor will drive the shaft 16 through the gear train 24. Under this condition the direction of rotation of shafts 16 and 23 will be as indicated by the arrows 30, Fig. 3, and the framework 25' or the gear casing 25 will remain stationary. The speed of the clock is controlled by the escapement and moreover the torque developed on the shaft 16 will be substantially constant, much more constant than in an ordinary spring clock where the torque varies from a maximum to a minimum during the unwinding of the spring.

Now let us assume the source of supply to the electric motor fails. The electric motor stops and the spring starts to unwind in the direction indicated by arrow 31, turning frame 25' with it in the direction indicated by arrow 32. The gear reduction in the train 24 is so great that this movement of frame 25' can not rotate the gears therein but instead all of the gears remain stationary with respect to the framework and the torque of the spring is conveyed to shaft 16 so that shaft 16, frame 25' and all of the parts carried in the framework rotate as a unit with shaft 16 in the direction indicated by arrows 30 as before. The speed of rotation is controlled by the escapement as before and the clock is driven in this way until the spring runs down or until the power supply of the electric motor comes on again.

If the clock movement and the spring is an ordinary 24 hour arrangement the chances are that the spring will not have run down before the power supply comes on again since 24 hour failures in the usual electric distribution system rarely if ever occur. In fact, a clock spring or weight capable of running the clock for an hour would be suitable in the vast majority of cases. When the electric power suppy comes on again the spring will be in a partially unwound condition.

The electric motor starts and takes up the burden of driving the clock. The electric motor torque at the speed necessary to drive the clock is in excess of that necessary for this purpose and as a result it tends to run at a higher speed. The speed of shaft 16 is limited by the escapement so that the excess torque of the motor is utilized in rewinding the spring. The frame 25' is thus turned in a direction opposite to that indicated by arrow 32 against the torque of the partially unwound spring and the spring is rewound by this movement up to a point where the counter torque thereof equals the excess torque of the motor. The frame 25' then comes to a stop and the electric motor slows down and thereafter rotates at the speed, determined by the clock escapement, for driving the clock with the frame 25' stationary. During the rewinding of the spring the gear train 24 serves two functions; first, the normal speed reducing function of driving the shaft 16 at a constant speed, and second, it functions with the rotatably mounted frame 25' as an epicyclic gear train to rewind the spring. These two functions are performed simultaneously. When the motor stops and the spring unwinds, the gear train serves the additional purpose of locking itself against backward rotation due to the high gear reduction employed. That is to say, it is an irreversible gear for any torque possible from the spring 10.

When the spring 10 is wound up in this way I do not imply that the spring is wound up tight to the extent that the ordinary hand-wound clock may be wound by a key. This is not practical nor desirable with a small motor such as is intended to be used with my invention. However, it is wound up to the extent determined by the available torque of the motor and the parts are proportioned so that the spring is normally substantially fully wound. Variations in torque of the motor caused by ordinary variations in voltage or frequency will be reflected by slight rotative movements of the frame 25' as the spring adjusts itself to these variations in maintaining a balanced condition. The apparatus may be considered as a differential having one side driven by the electric motor through an irreversible gear and the other side driving the clock. The central member of this differential is connected to the spring which serves to drive the clock when the motor is idle and which is rewound by the motor when the latter is in operation.

It will be evident that the torque conveyed to the clockwork always corresponds to the tension of the spring and since this is normally substantially constant we have the ideal condition necessary for high clock accuracy. When the clock is equipped with the key winding arrangement shown in Fig.

2, the clock may be wound by hand, if for any reason the motor breaks down or fails for any considerable length of time.

It will be evident that the casing 25 of Fig. 1 is the full equivalent of the frame 25' of Fig. 3 so far as the operation is concerned. The number of gear reducing units in the train 24 is different in the two figures but this does not alter the principles of operation involved.

In accordance with the provisions of the Patent Statutes I have described the principle of operation of my invention, together with the apparatus which I now consider to represent the best embodiment thereof; but I desire to have it understood that the apparatus shown and described is only illustrative and that the invention may be carried out by other means. In the specification and claims where I have specified an electric motor or a spring motor I intend to include their equivalents, for example the electric motor may be replaced by a water motor and the spring motor by a weight.

What I claim as new and desire to secure by Letters Patent of the United States, is as follows:

1. A shaft required to be driven at a constant speed and substantially constant torque, which shaft is restrained to run at such speed, an electric motor having stator and rotor elements for driving said shaft, speed reducing gearing between said rotor element and said shaft, a rotatably mounted gear casing enclosing and supporting said gearing and said rotor element, the shaft, the rotor and the gear casing having a common axis of rotation, and a spring motor geared to said casing and arranged to be wound and unwound by opposite rotary movements of said casing.

2. A movement required to be driven at a substantially constant speed and a substantially constant torque, which movement is restrained to run at such speed, a high speed electric motor having stator and rotor elements for driving said movement, speed reducing gearing having terminal shafts connected between said motor and movement, a rotatably mounted gear casing enclosing and supporting said gearing and the rotor element of the high speed motor, the terminal shafts of said gearing and said casing having a common axis of rotation, the arrangement being such that the transfer of power through said gearing from the motor to the movement tends to rotate said casing in one direction, and a spring associated with said casing in such a way as to be wound thereby when rotated in said one direction, and to rotate said casing and gearing as a unit in the opposite direction to drive the movement when the electric motor stops.

3. A driven shaft, an electric motor having stator and rotor elements for driving said shaft, a differential and speed reducing gearing connected between said motor and shaft, the gearing and rotor element of the motor being contained in a gear casing which comprises a rotatable element of the differential.

In witness whereof, I have hereto set my hand this 15th day of December, 1926.

HENRY E. WARREN.